United States Patent
Wang

(10) Patent No.: US 12,406,062 B2
(45) Date of Patent: Sep. 2, 2025

(54) INFORMATION SECURITY MANAGEMENT METHOD, SECURE MANAGEMENT CIRCUIT, AND SERVER

(71) Applicant: Wiwynn Corporation, New Taipei (TW)

(72) Inventor: Hsien-Yu Wang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 388 days.

(21) Appl. No.: 17/983,356

(22) Filed: Nov. 8, 2022

(65) Prior Publication Data
US 2024/0104212 A1 Mar. 28, 2024

(30) Foreign Application Priority Data
Sep. 27, 2022 (TW) ................................ 111136486

(51) Int. Cl.
*G06F 21/57* (2013.01)
*G06F 1/12* (2006.01)

(52) U.S. Cl.
CPC ................ *G06F 21/57* (2013.01); *G06F 1/12* (2013.01)

(58) Field of Classification Search
CPC ... G06F 21/57; G06F 1/12; G06F 1/14; G06F 2221/2111; G06F 21/64
See application file for complete search history.

(56) References Cited

U.S. PATENT DOCUMENTS

| 10,306,420 B2* | 5/2019 | Zhou | H04W 4/80 |
| 2003/0217151 A1* | 11/2003 | Roese | H04L 63/0492 709/225 |
| 2009/0327678 A1* | 12/2009 | Dutton | G06F 21/575 713/2 |
| 2013/0054960 A1* | 2/2013 | Grab | H04L 63/0428 726/17 |
| 2013/0347058 A1* | 12/2013 | Smith | G06F 21/57 726/1 |
| 2021/0334382 A1* | 10/2021 | Chhuor | G06F 21/44 |

FOREIGN PATENT DOCUMENTS

TW 200907740 2/2009

* cited by examiner

*Primary Examiner* — Ali S Abyaneh
(74) *Attorney, Agent, or Firm* — JCIPRNET

(57) ABSTRACT

An information security management method, a secure management circuit, and a server are provided. In the method, first position information is obtained through a root of trust (ROT) circuit. The first position information is verified through the ROT circuit to generate a first verification result of the first position information. One or more functions operated by a main processor are controlled through the ROT circuit according to the first verification result. Accordingly, the information security capability can be enhanced.

20 Claims, 9 Drawing Sheets

INFORMATION SECURITY MANAGEMENT METHOD, SECURE MANAGEMENT CIRCUIT, AND SERVER

CROSS-REFERENCE TO RELATED APPLICATION

This application claims the priority benefit of Taiwan application serial no. 111136486, filed on Sep. 27, 2022. The entirety of the above-mentioned patent application is hereby incorporated by reference herein and made a part of this specification.

BACKGROUND

Technical Field

The disclosure relates to an information security technology, and in particular, to an information security management method, a secure management circuit, and a server.

Description of Related Art

The server is usually equipped with a board management controller (BMC) to manage and connect modules and components with different functions on the motherboard. There is a hardware management module sub-project under an open compute project (OCP), which proposes a datacenter-ready secure control module (DC-SCM) and a hardware root of trust (ROT) module. The ROT module is commonly used to verify the integrity and confidentiality of system data, and can extend the trust to internal and external entities.

SUMMARY

The information security management method of an embodiment of the disclosure includes the following: obtaining first position information through a root of trust (ROT) circuit; verifying the first position information through the ROT circuit to generate a first verification result of the first position information; and controlling one or more functions operated by a main processor through the ROT circuit according to the first verification result.

The secure management circuit of an embodiment of the disclosure includes a ROT circuit. The ROT circuit is configured to obtain first position information. The first position information is verified to generate a first verification result of the first position information. One or more functions operated by a main processor are controlled according to the first verification result.

The server of an embodiment of the disclosure includes the above-mentioned secure management circuit, a board management controller (BMC), and a processor. The BMC is coupled to the secure management circuit. The main processor is coupled to the BMC.

In order to make the above-mentioned and other features and advantages of the disclosure easier to understand, the following embodiments are given and described in detail with the accompanying drawings as follows.

DESCRIPTION OF THE EMBODIMENTS

Figure 1:
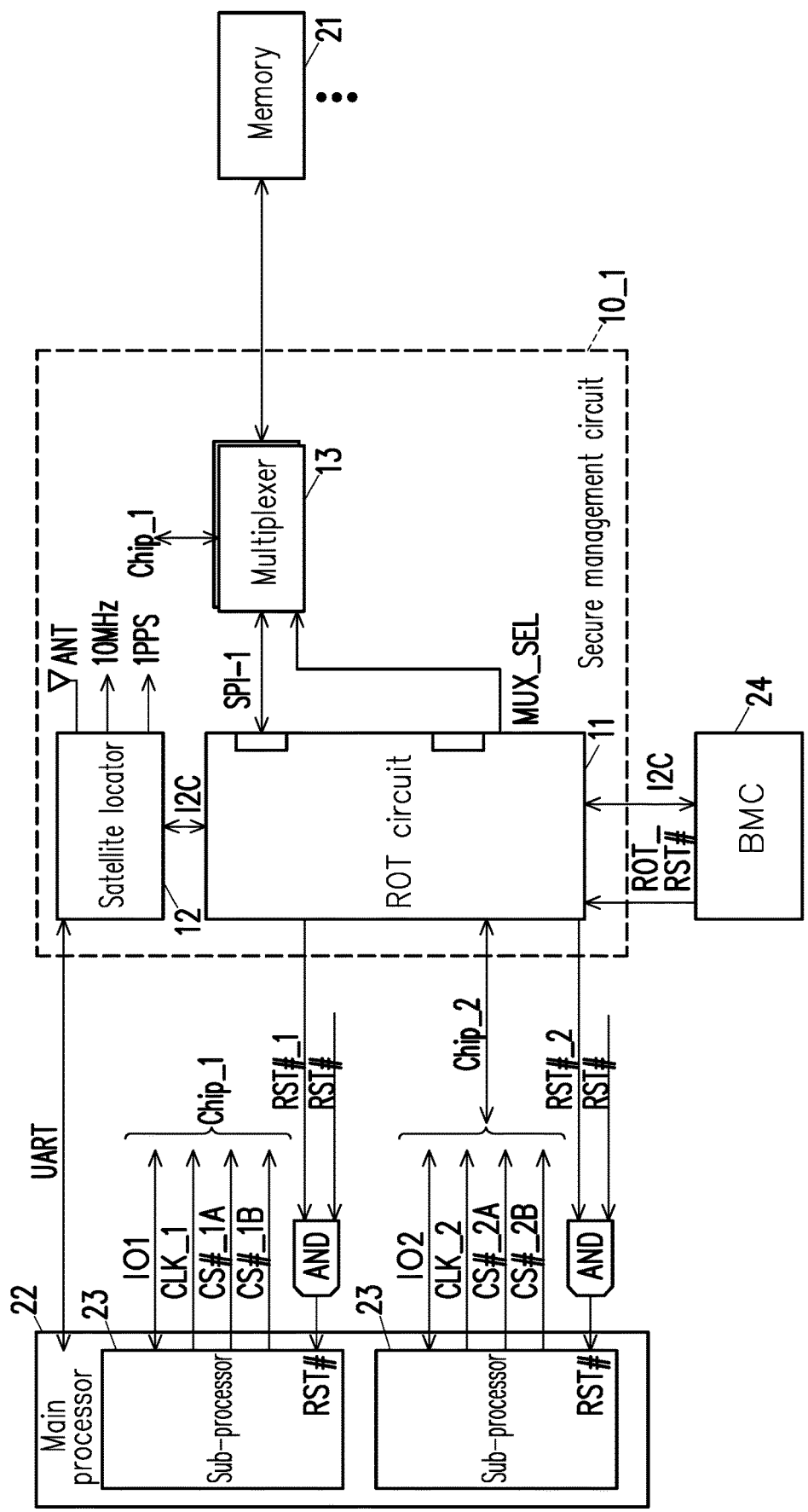
FIG. 1 is a component block diagram of a server according to an embodiment of the disclosure.

FIG. 1 is a component block diagram of a server 1 according to an embodiment of the disclosure. Referring to FIG. 1, the server 1 includes (but is not limited to) a secure management circuit 10_1, one or more memories 21, a main processor 22, one or more sub-processors 23, and a board management controller (BMC) 24.

The secure management circuit 10_1 includes (but is not limited to) a root of trust (ROT) circuit 11, a satellite locator 12, and one or more multiplexers 13. In one embodiment, a circuit and/or a component included in the secure management circuit 10_1 may be integrated into a module or a chip.

The ROT circuit 11 (or called ROT module or ROT chip) can be a microprocessor, a microcontroller, a field-programmable gate array (FPGA), or an application-specific integrated circuit (ASIC). In one embodiment, the ROT circuit 11 is used to perform one or more security functions, for example, measurement, storage, reporting, verifying, and/or updating. In some embodiments, the function of the ROT circuit 11 can also be implemented by a software.

The satellite locator 12 is coupled to the ROT circuit 11 (e.g., through an inter-integrated circuit (I2C) interface or other transmission interfaces). The satellite locator can be a receptor that supports a global positioning system (GPS), a GLONASS, a GALILEO, a BeiDou navigation satellite system, or other satellite locator systems, for example, obtaining a 10 MHz and a 1 PPS (One Pulse Per Second) precise time source through an ANT antenna. In one embodiment, the satellite locator 12 is used for receiving a positioning signal and generating a position information and/or time information accordingly. The position information can be a latitude and longitude, a coordinate in other geographic coordinate systems, or a relative position. The time information may include a time zone, a time, and/or a date, for example, the National Marine Electronics Association (NMEA) data.

The multiplexer 13 is coupled between the ROT circuit 11 and the memory 21 via a transmission interface SPI-1 (e.g., through a serial peripheral interface (SPI) or other transmission interfaces). In addition, the multiplexer 13 is coupled between the sub-processor 23 and the memory 21 via a transmission interface Chip_1 (e.g., through the SPI or other transmission interfaces).

In one embodiment, the multiplexer 13 is used to select and output data from the memory 21 to one of the ROT circuit 11 and the sub-processor 23. In one embodiment, the multiplexer 13 is used to select and output data from one of the ROT circuit 11 and the sub-processor 23 to the memory 21. In one embodiment, the ROT circuit 11 provides a selection pin MUX_SEL to select an input or an output target of the multiplexer 13. The number of the multiplexer 13 is not limited to the drawings.

The memory 21 may be any type of a fixed or a removable random-access memory (RAM), a read-only memory (ROM), a flash memory, similar devices, or a combination of the above devices. In one embodiment, the memory 21 records a code, a device configuration, temporary or permanent data (e.g., an image file, an access rule, or an authorized position), which will be described later.

The main processor 22 is coupled to the satellite locator 12 (e.g., through a universal asynchronous receiver/transmitter (UART) or other transmission interfaces). The main processor 22 may be a central processing unit (CPU), a system on a chip (SoC), a microprocessor, a microcontroller, a graphics processing unit (GPU), a digital signal processing (DSP) chip, a FPGA, an ASIC, or neural network accelerator. In one embodiment, the main processor 22 may operate a system (e.g., an operating system or a kernel system).

The main processor 22 includes one or more sub-processors 23. Alternatively, one or more processors 23 constitute the main processor 22. The sub-processor 23 (optional) is coupled to the ROT circuit 11 via the transmission interface Chip_1 and a transmission interface Chip_2 (e.g., the SPI or other interfaces). The sub-processor 23 may be a BMC, a SOC, a platform controller hub (PCH), an I/O Controller Hub (ICH), or other peripheral management interfaces. For example, the two processors 23 can respectively provide input and output pins IO1 and IO2, clock pins CLK_1 and CLK_2, and selection pins CS #_1A, CS #_1B, CS #_2A, and CS #_2B (via the transmission interface Chip_1 and the transmission interface Chip_2, respectively) to the ROT circuit 11. In addition, the sub-processor 23, for example, may further provide reset pins RST #, RST #_1, and RST #_2 (possibly with an AND logic circuit) to the ROT circuit 11. It should be noted that the number (i.e., two) of the sub-processors 23 shown in FIG. 1 is only for the purpose of illustration, and in other embodiments, there may be only one sub-processor 23 or other numbers of sub-processors 23.

The BMC 24 is coupled to the ROT circuit 11 (e.g., through the I2C interface or other transmission interfaces). In one embodiment, the BMC 24 also provides a reset pin ROT_RST # to the ROT circuit 11. The BMC 24 may be a microprocessor, a SOC, a microcontroller, a FPGA, or an ASIC. In one embodiment, the BMC 24 is used to manage and connect the module or the component with different functions (e.g., the secure management circuit 10_1 or a DC-SCM) and monitor the operation information of the module or component.

Figure 2:
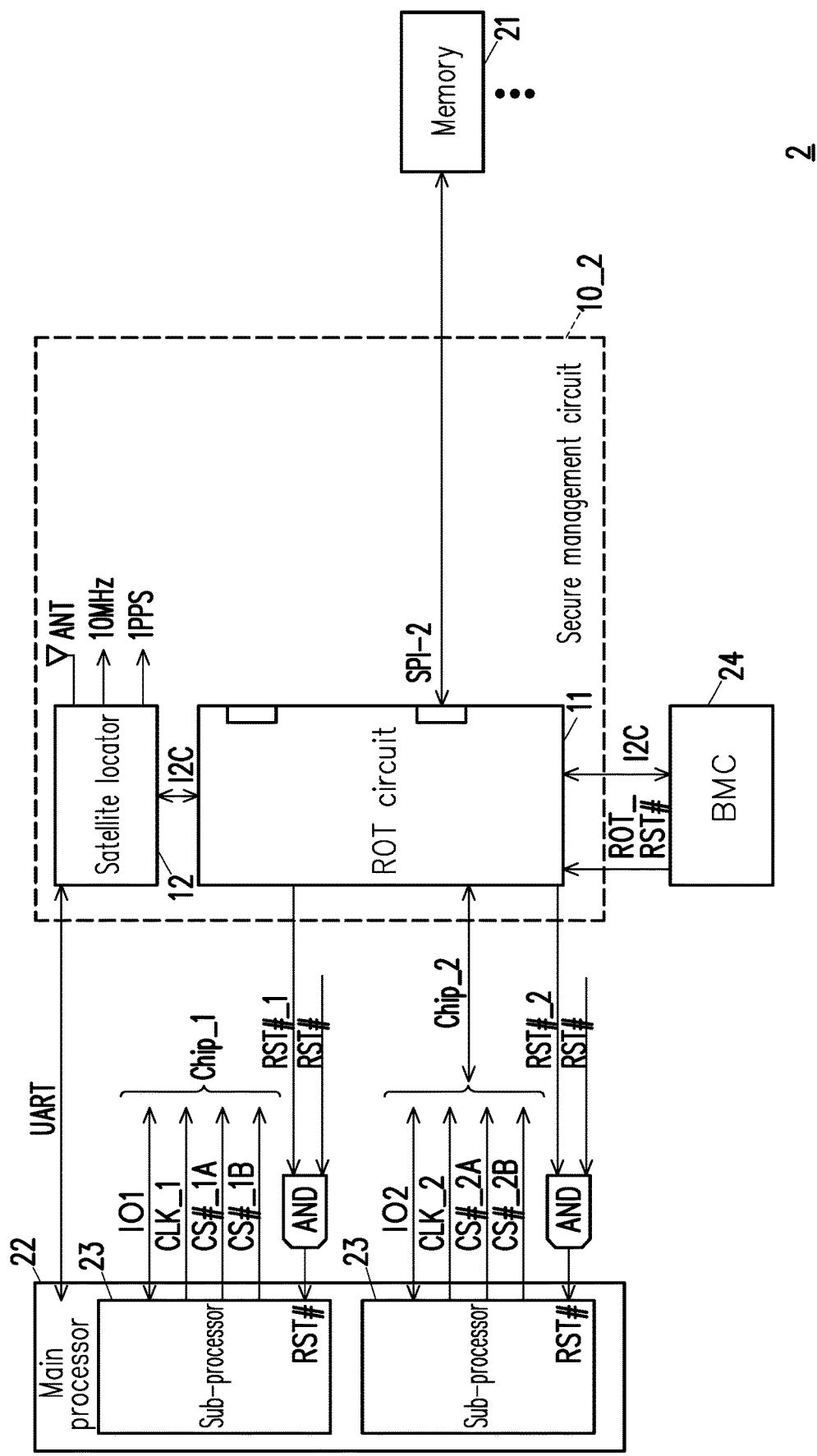
FIG. 2 is a component block diagram of a server according to an embodiment of the disclosure.

FIG. 2 is a component block diagram of a server 2 according to an embodiment of the disclosure. Referring to FIG. 1 and FIG. 2, the difference from the server 1 is that the ROT circuit 11 in a secure management circuit 10_2 of the server 2 is directly connected to the memory 21 via a transmission interface SPI-2 (e.g., the SPI or other transmission interfaces).

Figure 3:
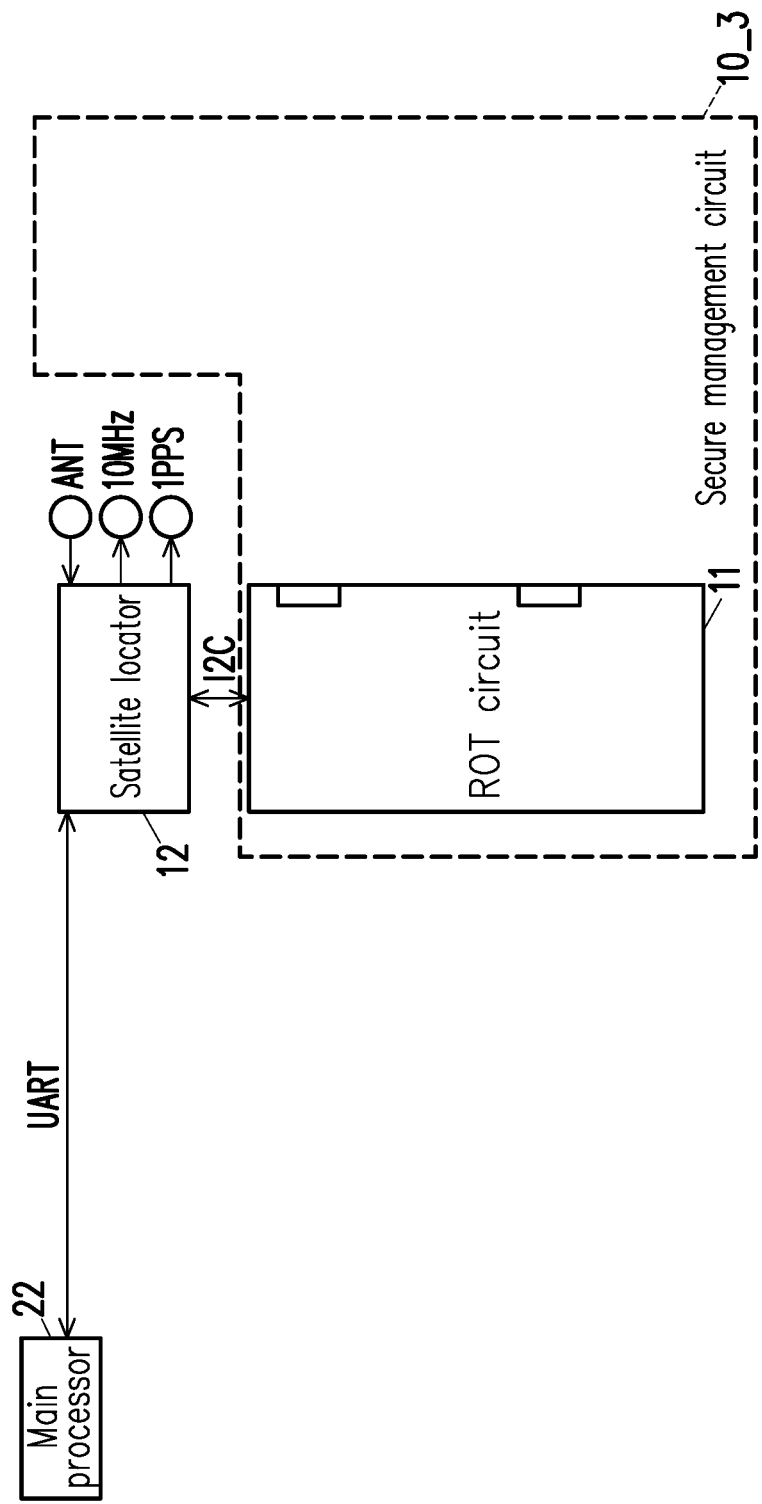
FIG. 3 is a schematic diagram of a component configuration according to an embodiment of the disclosure.

FIG. 3 is a schematic diagram of a component configuration according to an embodiment of the disclosure. Referring to FIG. 1 to FIG. 3, the difference from the secure management circuit 10_1 of the server 1 and the secure management circuit 10_2 of the server 2 is that a secure management circuit 10_3 includes the ROT circuit 11 but does not include the satellite locator 12. That is, the satellite locator 12 is independent of the secure management circuit 10_3. In some embodiments, the satellite locator 12 may be disposed on a motherboard (MB) (e.g., the motherboard available for the main processor 22 to be disposed on) or another small board.

Figure 4C:
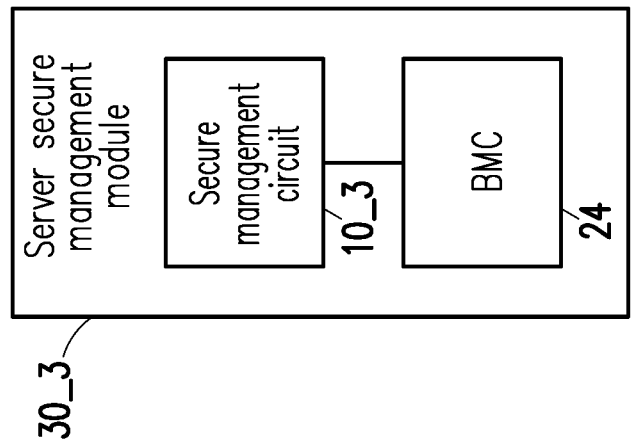
FIG. 4A to FIG. 4C are component block diagrams of a server secure management module according to an embodiment of the disclosure.
Figure 4B:
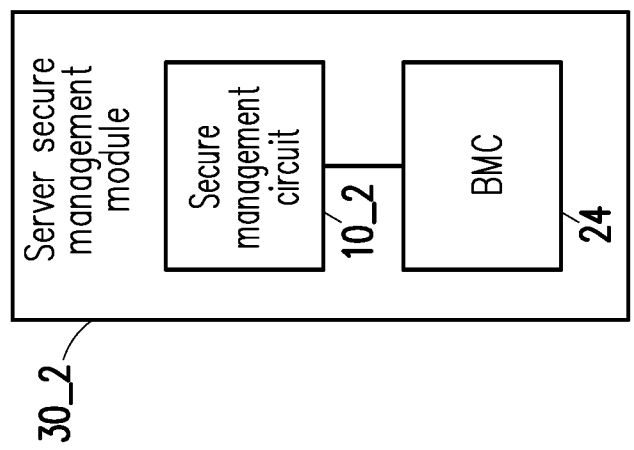
Figure 4A:
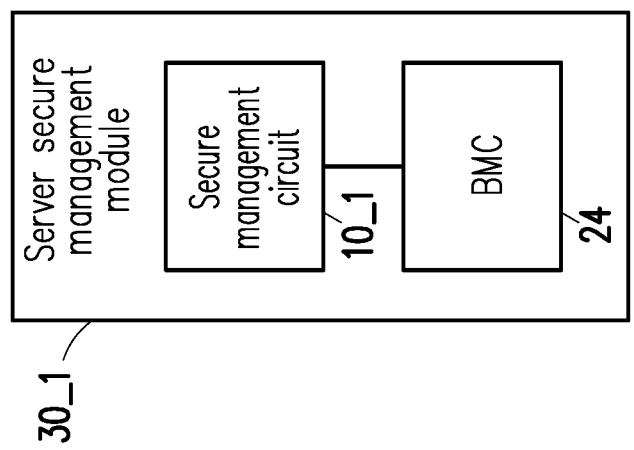

FIG. 4A to FIG. 4C are component block diagrams of a server secure management module 30_1, a server secure management module 30_2, and a server secure management module 30_3 according to an embodiment of the disclosure. Referring to FIG. 4A, the secure management circuit 10_1 and the BMC 24 are both disposed in the server secure management module 30_1. That is, the server secure management module 30_1 includes the secure management circuit 10_1 and the BMC 24. Referring to FIG. 4B, the secure management circuit 10_2 and the BMC 24 are both disposed in the server secure management module 30_2. That is, the server secure management module 30_2 includes the secure management circuit 10_2 and the BMC 24. Referring to FIG. 4C, the secure management circuit 10_3 and the BMC 24 are both disposed in the server secure management module 30_3. That is, the server secure management module 30_3 includes the secure management circuit 10_3 and the BMC 24.

The aforementioned "both disposed in" means that both components may be disposed in the same circuit board. In one embodiment, the server secure management module 30_1, the server secure management module 30_2, and the server secure management module 30_3 may be in the form of an interface card, so as to be easily installed on the motherboard of the server 1 and server 2, for example, a datacenter-ready secure control module (DC-SCM) interface card.

Hereinafter, the method according to the embodiment of the disclosure will be described with reference to each component or module in FIG. 1 to FIG. 4C. Each process of the method in the embodiment of the disclosure can be adjusted according to the implementation situation, and is not limited hereto.

Figure 5:
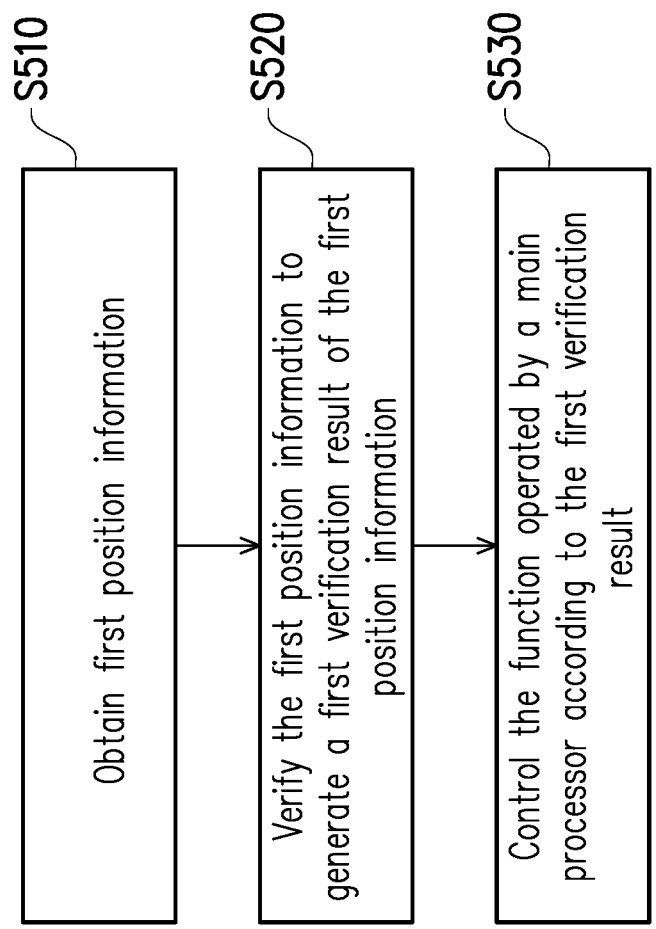
FIG. 5 is a flow diagram of an information security management method according to an embodiment of the disclosure.

FIG. 5 is a flow diagram of an information security management method according to an embodiment of the disclosure. Referring to FIG. 5, the ROT circuit 11 obtains the first position information (step S510). Specifically, the satellite locator 12 calculates the first position information according to a signal from a satellite. The position information (e.g., first position information or other position information) herein may be a latitude and longitude, an altitude, a two-degree zonal coordinate, or a relative position to a reference position. The ROT circuit 11 obtains the first position information from the satellite locator 12.

The ROT circuit 11 verifies the first position information to generate a first verification result of the first position information (step S520). Specifically, since the ROT circuit 11 and the satellite locator 12 are equipped in the server 1 and the server 2, the position information obtained by the satellite locator 12 also represents the position of the server 1 and the server 2. It is worth noting that, assuming the situation that the server 1 and the server 2 are stolen, the position of server 1 and server 2 may not be in the original computer room. Therefore, it is necessary to further restrict the function of the server 1 and the server 2 to prevent the stealing of confidential information or the information security breach.

In one embodiment, the ROT circuit 11 may compare the first position information with one or more authorized positions. The authorized position may be a predefined position available for the server 1 and the server 2 to be placed. For example, the authorized position is the position recorded by a whitelist. The authorized position can be stored in the memory 21 or a built-in memory (not shown)

of the ROT circuit 11/the secure management circuit 10_1, the secure management circuit 10_2, and the secure management circuit 10_3. Since the access of the memory 21 or the built-in memory of the ROT circuit 11/the secure management circuit 10_1, the secure management circuit 10_2, and the secure management circuit 10_3 needs to be verified by the ROT circuit 11, it can prevent others from tampering with the authorized position arbitrarily.

The first verification result includes the following: the first position information conforms to one or more authorized positions and the first position information does not conform to one or more authorized positions. In one embodiment, since the satellite locator may have an error, the ROT circuit 11 can determine whether the distance between the coordinate of the first position information and the authorized position is within a locating error range. If the coordinate of the first position information is the same as the authorized position or the distance between the coordinate of the first position information and the authorized position is within the locating error range, the ROT circuit 11 determines that the first position information conforms to the authorized position as the first verification result. If the coordinate of the first position information is different from the authorized position and/or the distance between the coordinate of the first position information and the authorized position is not within the locating error range, the ROT circuit 11 determines that the first position information does not conform to the authorized position as the first verification result.

The ROT circuit 11 controls the function operated by the main processor 22 and/or the sub-processor 23 according to the first verification result (step S530). Specifically, the first verification result can be used to know whether the current position of the server 1 and the server 2 conforms to the authorized position. If the current position of the server 1 and the server 2 does not conform to the authorized position, the embodiment of the disclosure proposes an information security prevention mechanism with functional limitation. The function of the main processor 22 and/or the sub-processor 23 are various, for example, changing the power state, the connection state, or the access condition of the component of the system in which the main processor 22 and/or the sub-processor 23 operates. In addition, the function of controlling the main processor 22 can be achieved by controlling the sub-processor 23 through the ROT circuit 11.

In one embodiment, the first verification result is the basis on which the main processor 22 and/or the sub-processor 23 are allowed to use the resource. The resource can be a software or a hardware resource. The software resource is, for example, an application, a service, or a function. The hardware resource is, for example, a memory, a network, or a computing resource. If, as the first verification result, the first position information conforms to the authorized position, it may be further verified whether the main processor 22 and/or the sub-processor 23 are allowed to use the resource. If, as the first verification result, the first position information does not conform to the authorized position, the ROT circuit 11 can prohibit/block/prevent the main processor 22 and/or the sub-processor 23 from using the resource. For example, the ROT circuit 11 notifies the main processor 22 by sending an instruction or a signal, or changing a level or a waveform of the pin to the sub-processor 23.

Figure 6:
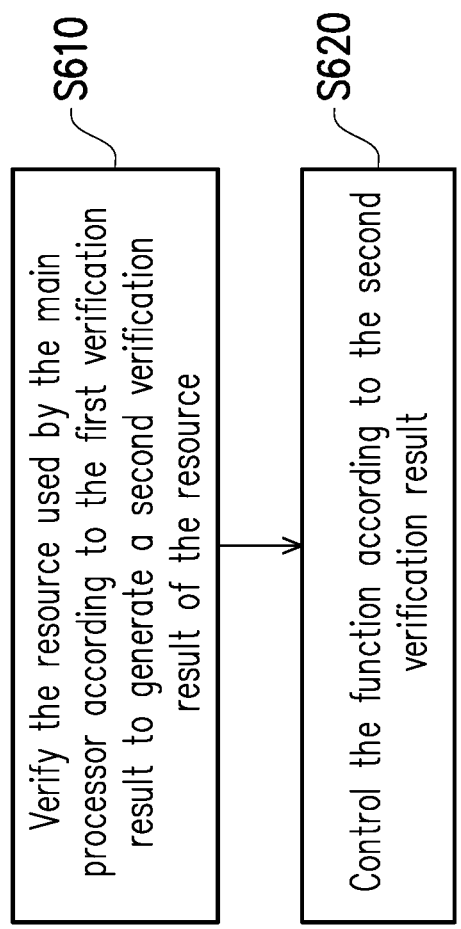
FIG. 6 is a flow diagram of a resource verification method according to an embodiment of the disclosure.

FIG. 6 is a flow diagram of a resource verification method according to an embodiment of the disclosure. Referring to FIG. 6, the ROT circuit 11 can verify the resource used by the main processor 22 and/or the sub-processor 23 according to the first verification result to generate a second verification result of the resource (step S610). As described above, the resource used by the main processor 22 and/or the sub-processor 23 only needs to be verified when the first position information conforms to the authorized position as the first verification result. The second verification result includes the following: the main processor 22 and/or the sub-processor 23 are allowed to use the resource and the main processor 22 and/or the sub-processor 23 are not allowed to use the resource.

Next, the ROT circuit 11 may control the function of the main processor 22 and/or the sub-processor 23 according to the second verification result (step S620). The function is provided by the main processor 22 and/or the sub-processor 23 using the resource. If, as the second verification result, the main processor 22 and/or the sub-processor 23 are allowed to use the resource, the main processor 22 and/or the sub-processor 23 can use the resource and implement the corresponding function accordingly. However, if, as the second verification result, the main processor is not allowed/prohibited from using the resource, the main processor 22 and/or the sub-processor 23 are blocked/prohibited from implementing the corresponding function, and all or part of the functions are restricted.

In one embodiment, the resource is an executable image file. A system (e.g., the operating system or the kernel system) can be turned on in response to the main processor 22 loading the executable image file, that is, the executable image file of the system.

Figure 7:
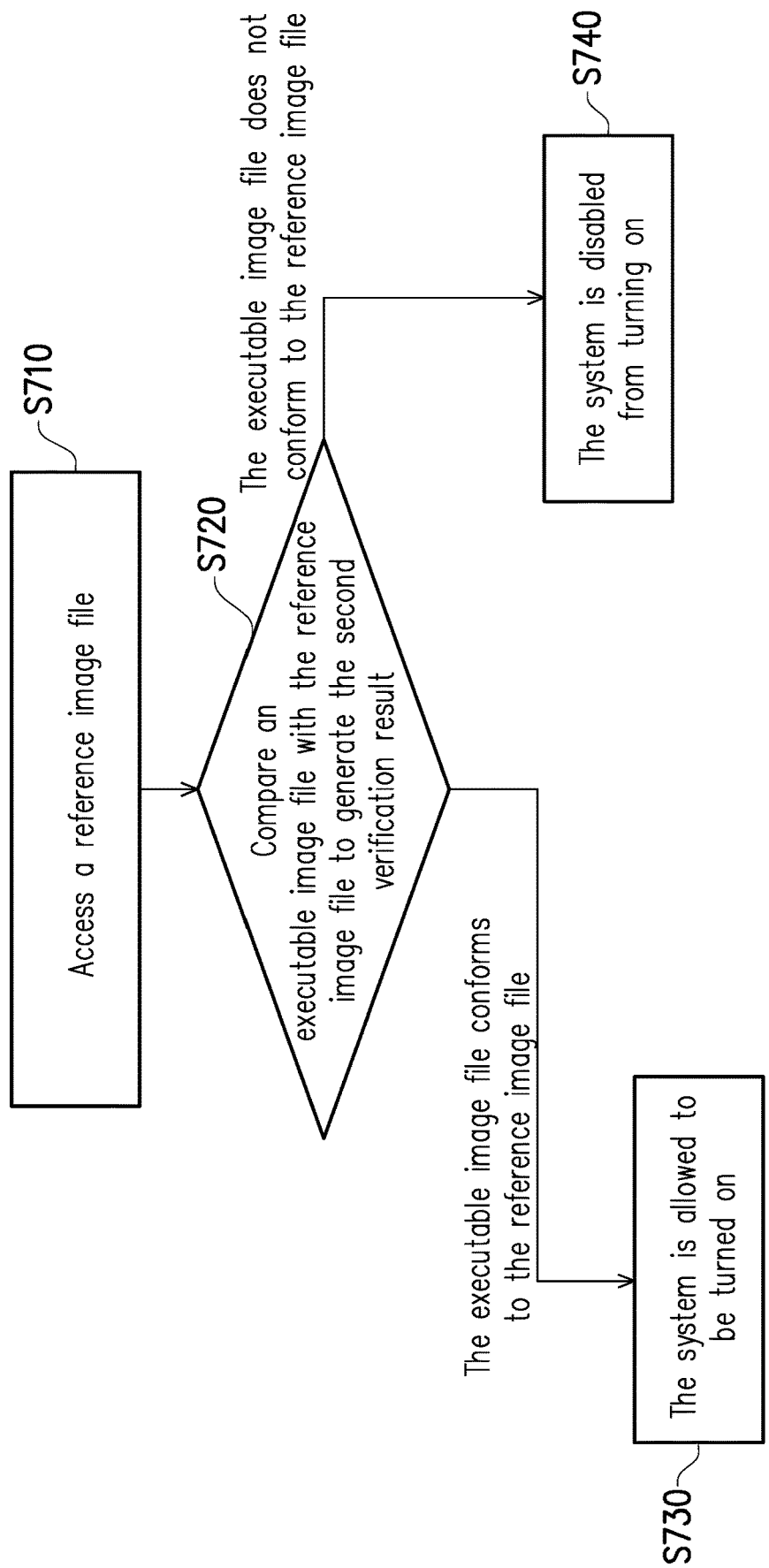
FIG. 7 is a flow diagram of an image file verification according to an embodiment of the disclosure.

FIG. 7 is a flow diagram of an image file verification according to an embodiment of the disclosure Referring to FIG. 7, the ROT circuit 11 can access the reference image file from the memory 21 or the built-in memory of the ROT circuit 11/the secure management circuit 10_1, the secure management circuit 10_2, and the secure management circuit 10_3 (step S710). The reference image file can be a signed image file or a golden image file. The reference image file and the executable image file are stored in different memories. That is, the executable image file is stored in a memory other than the memory 21 or the built-in memory of the ROT circuit 11/the secure management circuit 10_1, the secure management circuit 10_2, and the secure management circuit 10_3. The ROT circuit 11 may compare the executable image file with the reference image file to generate the second verification result (step S720). In the embodiment, the second verification result includes the following: the executable image file conforms to the reference image file and the executable image file does not conform to the reference image file. The comparison of the image file may be to determine the integrity of the executable image file, the similarity between the two image files, and/or the authorization condition.

In response to the executable image file conforming to the reference image file, the ROT circuit 11 allows the main processor 22 to turn on the system (step S730). That is, the function of the main processor 22 of the embodiment of the disclosure is to turn on/initiate the system. On the other hand, in response to the executable image file not conforming to the reference image file, the ROT circuit 11 disables/prohibits/prevents the main processor 22 from turning on the system (step S740). In other embodiments, the ROT circuit 11 may also disable/prohibit/prevent the network function, the input/output function, or other functions of the system.

In one embodiment, the ROT circuit 11 can disable/prohibit/prevent a first instruction from accessing the memory 21 or other memories according to the access rule of the first position information. The access rule includes a second instruction corresponding to the first position information and allowed to access the memory 21. For example, the second instruction at location A is to write. That is, if the server 1 and the server 2 are located at location A, the ROT circuit 11 or the sub-processor 23 allows the memory 21 to be written. However, the second instruction at location B is to read. That is, if the server 1 and the server 2 are located at location B, the ROT circuit 11 or the sub-processor 23 allows the memory 21 to be read. Since the first instruction is different from the second instruction, the ROT circuit 11 or the sub-processor 23 cannot use the first instruction to access the memory 21.

Figure 8:
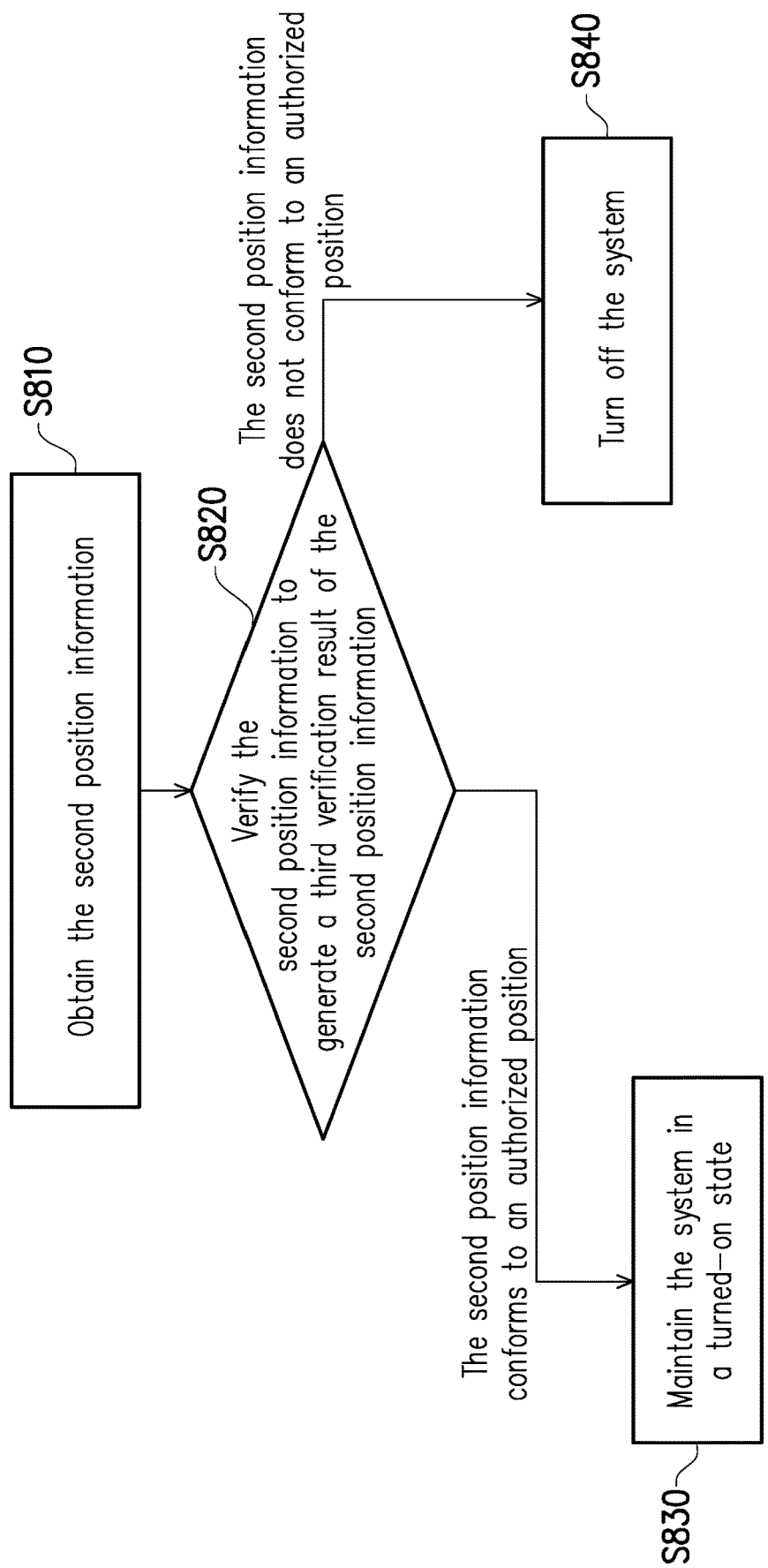
FIG. 8 is a flow diagram of a position verification method according to an embodiment of the disclosure.

The system can be turned on in response to the main processor 22 loading the executable image file. It should be noted that the position information from the satellite locator 12 is not limited to being provided to the ROT circuit 11. FIG. 8 is a flow diagram of a position verification method according to an embodiment of the disclosure. Referring to FIG. 8, the main processor 22 can obtain second position information (step S810). Similarly, the satellite locator 12 calculates the second position information according to the signal from the satellite. For an example of the second position information, reference may be made to the description of the first position information and is not be repeated here. Therefore, the main processor 22 can obtain the second position information from the satellite locator 12.

The main processor 22 may verify the second position information to generate a third verification result of the second position information (step S820). In one embodiment, the main processor 22 may compare the second position information with one or more authorized positions. The authorized position may be the same or different from the position used to compare the first position information.

The third verification result includes the following: the second position information conforms to one or more authorized positions and the second position information does not conform to one or more authorized positions. In one embodiment, since the satellite locator may have an error, the main processor 22 can determine whether the distance between the coordinate of the second position information and the authorized position is within the locating error range. If the coordinate of the second position information is the same as the authorized position or the distance between the coordinate of the second position information and the authorized position is within the locating error range, the main processor 22 determines that the second position information conforms to the authorized position as the third verification result. If the coordinate of the second position information is different from the authorized position and/or the distance between the coordinate of the second position information and the authorized position is not within the locating error range, the main processor 22 determines that the second position information does not conform to the authorized position as the third verification result.

In response to the second position information conforming to the authorized position as the third verification result, the main processor 22 may maintain the system in a turned-on state (step S830). That is, when the system is turned on, the system continues to operate to maintain the turned-on state. On the other hand, in response to the second position information not conforming to the authorized position as the third verification result, the main processor 22 may turn off the system (step S840). In one embodiment, in response to the second position information not conforming to the authorized position as the third verification result, the main processor 22 may record or report the second position information. For example, the second position information is written into an event log or transmitted to other devices through a communication transceiver (not shown). In other embodiments, the main processor 22 may also disable/prohibit/prevent the network function, the input/output function, or other functions of the system.

In one embodiment, the satellite locator 12 can also generate time information according to the signal received. The time information is, for example, a time zone, a date and/or a time. The main processor 22 can obtain the time information corresponding to the second position information, and synchronize the system time of the system in which the main processor 22 operates with the time information (i.e., an accurate time) from the satellite locator 12, for example, setting the system time to be the same as the time information of the satellite locator 12.

In order to facilitate the understanding of the spirit of the disclosure, a description of an application scenario is given below.

Figure 9:
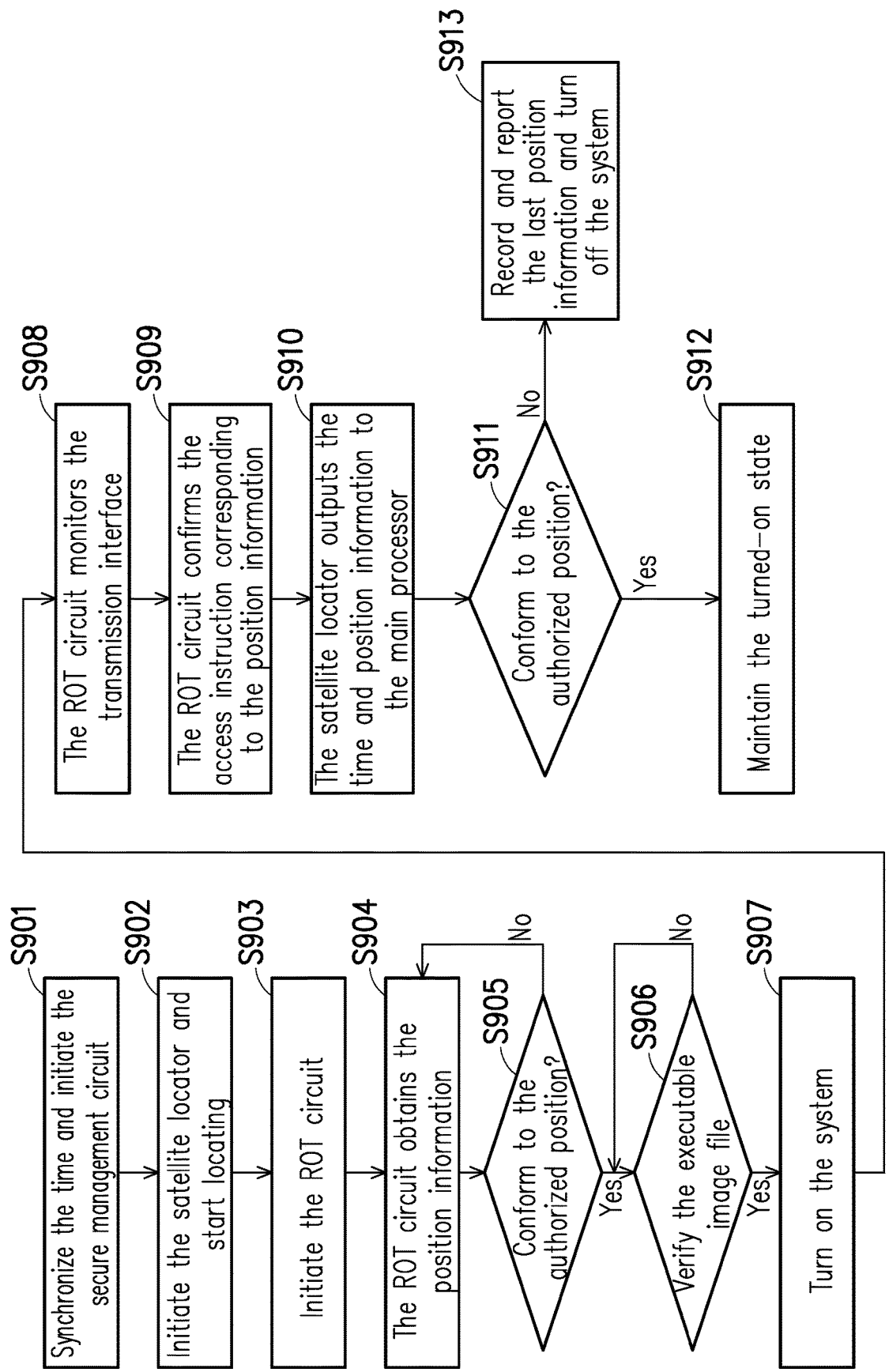
FIG. 9 is a flow diagram of a server application scenario according to an embodiment of the disclosure.

FIG. 9 is a flow diagram of a server application scenario according to an embodiment of the disclosure. Referring to FIG. 9, the sequence of steps can still be changed according to actual needs. The secure management circuit 10_1, the secure management circuit 10_2, and the secure management circuit 10_3 are turned on (step S901). The satellite locator 12 is initiated and locating is turned on accordingly (step S902). Furthermore, the ROT circuit 11 is initiated (step S903). The ROT circuit 11 obtains the position information from the satellite locator 12 (step S904) and determines whether the current position information conforms to the authorized position in the whitelist (step S905). If the current position information does not conform to the authorized position, the ROT circuit 11 can continue to obtain the position information or directly turn off the power of the server 1 and the server 2. If the current position information conforms to the authorized position, the ROT circuit 11 verifies whether the executable image file conforms to the reference image file (step S906). If the executable image file does not conform to the reference image file, the ROT circuit 11 can continue to compare the image file or directly turn off the power of the server 1 and the server 2. If the executable image file conforms to the reference image file, the ROT circuit 11 can trigger the main processor 22 to load the executable image file and turn on the system (step S907). It should be noted that, in some embodiments, step S905 and step S906 may be performed simultaneously.

After the system is turned on, the ROT circuit 11 continues to monitor the transmission interface connected to the memory 21 (step S908) and confirms whether the instruction via the transmission interface conforms to the access instruction (e.g., the aforementioned second instruction) corresponding to the position information (step S909).

In addition, the satellite locator 12 outputs the current time and position information to the main processor 22 (step S910). The main processor 22 may synchronize the time information and determine whether the current position information conforms to the authorized position (step S911). If the current position information conforms to the authorized position, the main processor 22 keeps the turned-on system continuously turned on (i.e., maintains the turned-on state) (step S912). If the position information does not conform to the authorized position, the main processor 22 records or reports the last position information and turns off the system (step S913).

To sum up, in the information security management method, secure management circuit, and server of the embodiment of the disclosure, whether the server is moved to an unauthorized position (i.e., different from the authorized position) is determined through the ROT circuit so as to provide the corresponding functional limitation. In addition, the mobile base station has the requirement for time synchronization, and the server used for the base station can also be synchronized with the standard time used for satellite locator. Accordingly, the requirement of the server of the mobile network is met, and additional security management can be provided.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. An information security management method, comprising:
    obtaining, through a root of trust (ROT) circuit, first position information;
    verifying, through the ROT circuit, the first position information to generate a first verification result of the first position information; and
    controlling at least one function operated by a main processor through the ROT circuit according to the first verification result, wherein the first verification result is a basis on which the main processor is allowed to use a resource, and the information security management method further comprises:
    verifying, through the ROT circuit, the resource used by the main processor according to the first verification result to generate a second verification result of the resource; and
    controlling, through the ROT circuit, the at least one function according to the second verification result, wherein the resource is an executable image file of a system, the system is turned on in response to the main processor loading the executable image file, and verifying the resource comprises:
    accessing, through the ROT circuit, a reference image file; and
    comparing, through the ROT circuit, the executable image file with the reference image file to generate the second verification result, wherein
        the second verification result is one of the executable image file conforming to the reference image file or the executable image file not conforming to the reference image file, and
        the reference image file and the executable image file are stored in different memories.

2. The information security management method according to claim 1, wherein verifying the first position information comprises:
    comparing the first position information with at least one authorized position, wherein the first verification result is one of the first position information conforming to the at least one authorized position and the first position information not conforming to the at least one authorized position.

3. The information security management method according to claim 1, wherein controlling the at least one function operated by the main processor comprises:
    allowing the main processor to turn on the system in response to the executable image file conforming to the reference image file, wherein the at least one function comprises turning on the system; and
    disabling the main processor from turning on the system in response to the executable image file not conforming to the reference image file.

4. The information security management method according to claim 1, wherein a system is turned on in response to the main processor loading an executable image file, and the information security management method further comprises:
    obtaining, through the main processor or the ROT circuit, second position information;
    verifying, through the main processor or the ROT circuit, the second position information to generate a third verification result of the second position information;
    maintaining the system in a turned-on state in response to the second position information conforming to at least one authorized position as the third verification result; and
    turning off the system in response to the second position information not conforming to the at least one authorized position as the third verification result.

5. The information security management method according to claim 4, further comprising:
    recording or reporting the second position information in response to the second position information not conforming to the at least one authorized position as the third verification result.

6. The information security management method according to claim 4, wherein controlling the at least one function operated by the main processor comprises:
    obtaining, through the main processor, time information corresponding to the second position information; and
    synchronizing a system time of the main processor with the time information.

7. The information security management method according to claim 1, further comprising:
    prohibiting a first instruction from accessing a memory according to an access rule of the first position information, wherein the access rule comprises a second instruction corresponding to the first position information and allowed to access the memory, and the first instruction is different from the second instruction.

8. A secure management circuit, comprising:
    a root of trust (ROT) circuit configured to:
        obtain first position information;
        verify the first position information to generate a first verification result of the first position information; and
        control at least one function operated by a main processor according to the first verification result, wherein the first verification result is a basis on which the main processor is allowed to use a resource, and the ROT circuit is further configured to:
        verify the resource used by the main processor according to the first verification result to generate a second verification result of the resource; and
        control the at least one function according to the second verification result, wherein the resource is an executable image file of a system, the system is turned on in response to the main processor loading the executable image file, and the ROT circuit is further configured to:
        access a reference image file; and
        compare the executable image file with the reference image file to generate the second verification result, wherein
            the second verification result is one of the executable image file conforming to the reference image file or the executable image file not conforming to the reference image file, and the reference image file and the executable image file are stored in different memories.

9. The secure management circuit according to claim 8, wherein the ROT circuit is coupled to a satellite locator, and the satellite locator is configured to generate the first position information.

10. The secure management circuit according to claim 9, further comprising the satellite locator.

11. The secure management circuit according to claim 8, wherein the ROT circuit is further configured to:
    compare the first position information with at least one authorized position, wherein the first verification result is one of that the first position information conforming to the at least one authorized position and the first position information not conforming to the at least one authorized position.

12. The secure management circuit according to claim 8, wherein the ROT circuit is further configured to:
    allow the main processor to turn on the system in response to the executable image file conforming to the reference image file, wherein the at least one function comprises turning on the system; and
    disable the main processor from turning on the system in response to the executable image file not conforming to the reference image file.

13. The secure management circuit according to claim 8, wherein the ROT circuit is further configured to:
    prohibit a first instruction from accessing a memory according to an access rule of the first position information, wherein the access rule comprises a second instruction corresponding to the first position information and allowed to access the memory, and the first instruction is different from the second instruction.

14. A server, comprising:
    a secure management circuit, comprising:
    a root of trust (ROT) circuit configured to:
        obtain first position information;
        verify the first position information to generate a first verification result of the first position information; and
        control at least one function operated by a main processor according to the first verification result, wherein the first verification result is a basis on which the main processor is allowed to use a resource, and the ROT circuit is further configured to:
        verify the resource used by the main processor according to the first verification result to generate a second verification result of the resource; and
        control the at least one function according to the second verification result, wherein the resource is an executable image file of a system, the system is turned on in response to the main processor loading the executable image file, and the ROT circuit is further configured to:
        access a reference image file; and
        compare the executable image file with the reference image file to generate the second verification result, wherein
        the second verification result is one of the executable image file conforming to the reference image file or the executable image file not conforming to the reference image file, and
        the reference image file and the executable image file are stored in different memories;
    a board management controller (BMC), coupled to the secure management circuit; and
    the main processor, coupled to the board management controller.

15. The server according to claim 14, further comprising:
    a satellite locator, coupled to the ROT circuit and the main processor and configured to generate the first position information.

16. The server according to claim 15, wherein the secure management circuit further comprises the satellite locator.

17. The server according to claim 16, further comprising:
    a server secure management module, wherein the secure management circuit and the board management controller are both disposed in the server secure management module.

18. The server according to claim 15, wherein the main processor is further configured to:
    obtain second position information generated by the satellite locator;
    verify the second position information to generate a third verification result of the second position information;
    maintain a system in a turned-on state in response to the second position information conforming to at least one authorized position as the third verification result, wherein the system is turned on in response to the main processor loading an executable image file; and
    turn off the system in response to the second position information not conforming to the at least one authorized position as the third verification result.

19. The server according to claim 18, wherein the main processor is further configured to:
    record or report the second position information in response to the second position information not conforming to the at least one authorized position as the third verification result.

20. The server according to claim 18, wherein the main processor is further configured to:
    obtain time information corresponding to the second position information, wherein the satellite locator also generates the time information; and
    synchronize a system time of the main processor with the time information.

* * * * *